July 19, 1960
W. G. MASON ET AL
2,945,446
PRESSURE SENSITIVE RESERVOIR EMPTYING
SYSTEM AND APPARATUS THEREFOR
Filed May 15, 1957
2 Sheets-Sheet 1
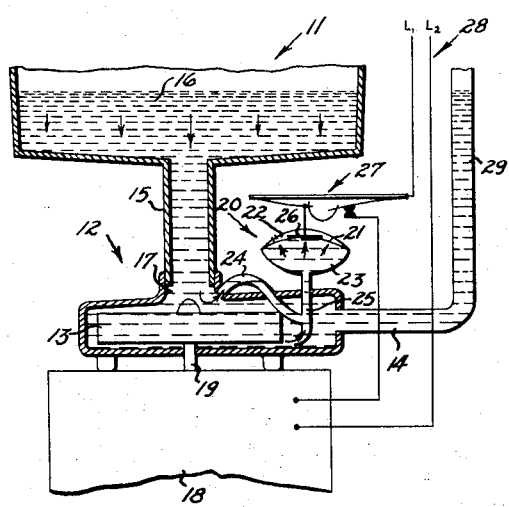
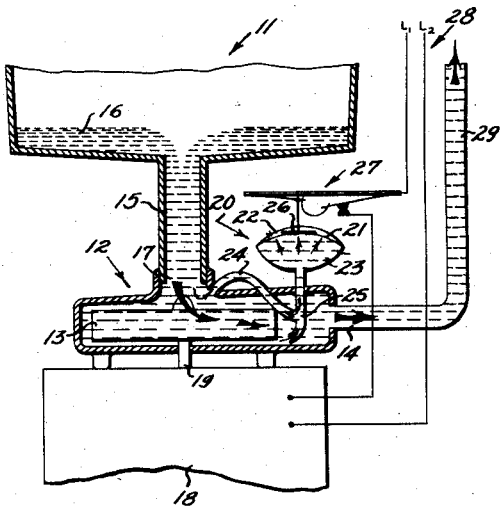
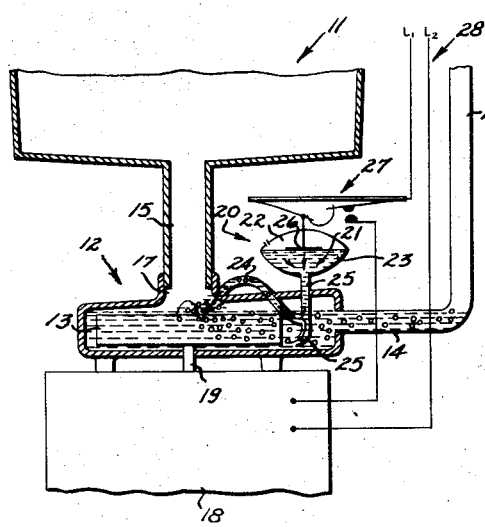
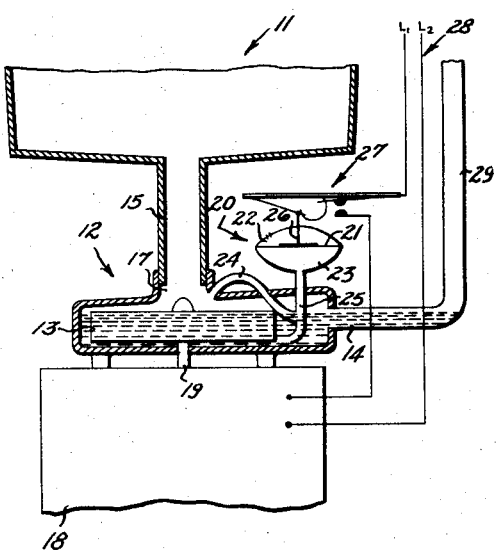
INVENTORS
FREDERICK J. MASON
WILLIAM G. MASON
BY
ATTORNEY

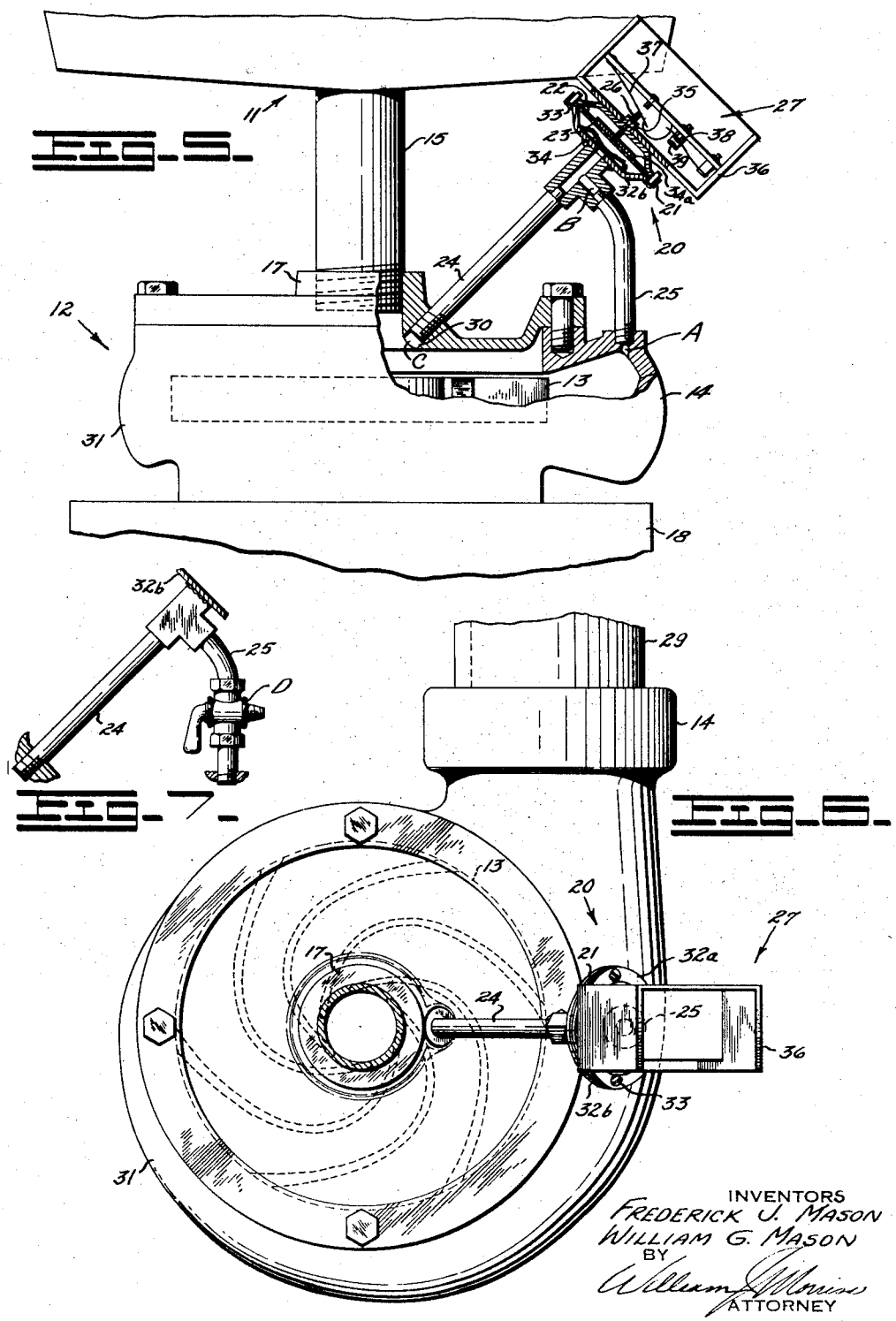

United States Patent Office 2,945,446
Patented July 19, 1960

2,945,446
PRESSURE SENSITIVE RESERVOIR EMPTYING SYSTEM AND APPARATUS THEREFOR

William G. Mason, 201 E. Kirby, Detroit 2, Mich., and Frederick J. Mason, 2898 Yorkshire, Birmingham, Mich.

Filed May 15, 1957, Ser. No. 659,308

8 Claims. (Cl. 103—25)

The present invention comprises a simple automatic system and apparatus for the evacuation of fluid reservoirs of the type where the contents of the reservoir must be lifted to an elevation above the means static head of the contents within the reservoir. More particularly the invention relates to a pumping control system and apparatus wherein the pumping element is energized by a selected static head pressure and the energization is sustained until the complete contents of the reservoir are removed or discharged whereupon pumping ceases until the selected static head pressure is re-established in the reservoir.

In many instances where a pump is required to elevate the fluid contents of a reservoir to a level above the mean static head of the material within the reservoir, the pumping unit had required manual or float control. Where manual control is employed a constant watch over level is necessary or the pumping means operates at dangerous no-load conditions to the serious impairment of pump bearings and seals. Where float control is relied upon it is impossible to completely exhaust the contents of the reservoir since the float implies a draft established by the weight of the float in the fluid content of the reservoir. Thus, the simple float must de-energize the pumping means at a time when the float reaches the downward end of its travel and therefore leaves a residual fluid in the reservoir. Complicated time delay means have been employed along with pressure sensing elements in association with floats to attempt a complete evacuation of reservoir contents. Some of such control systems, in association with initial float control, have been relatively successful, but the attendant apparatus including the limitations of the float itself have made such systems expensive and troublesome. The problems thus presented by the prior art are those of developing a system for complete reservoir evacuation which is automatic, being energized at a selected level of contents within the container or reservoir and a system which does not discontinue the pumping action until the contents of the reservoir are removed, as in complete elimination of troublesome float elements and their associated mechanical linkages. A chemical unit processes approach automation such a pumping system to overcome these problems is in distinct demand. This is also true in laundry tray units and submersible pump use in both household and industrial applications.

It is therefore among the objects of the present invention to provide an automatic pumping system and apparatus for raising the contents of a container above the mean level of contents in the container and completely exhausting the container.

Another object is to provide such an automatic pumping system which is easily field adjusted to various pressure head conditions so as to achieve operational positiveness independent of particular pump characteristics.

Another object is to provide a floatless apparatus which energizes a pump at a selected fluid level and maintains that energization until the fluid is exhausted from the container.

It is still another object to provide a floatless reservoir emptying system and apparatus wherein a single pressure sensing element is employed to start a pump at a selected pressure head; and maintain pumping until all of the reservoir contents are removed.

It is still another object to provide a reservoir emptying system and apparatus wherein the pressure sensing means is delicately balanced against narrow ranges of differential pressures so as to give a positive desired response without "bounce" or false cycling.

Other objects such as extreme simplicity and economy of installation and maintenance attendant to both the system and apparatus will become increasingly apparent to those skilled in the art as the description proceeds.

In the drawings:

Figure 1 is a schematic elevational view of a system and apparatus in accord with the present invention and indicating a level of fluid contents in the reservoir at a preselected static head pressure sufficient to energize the pump element.

Figure 2 is a schematic elevational view of the same system and apparatus as illustrated in Figure 1 and indicates partial evacuation of contents from the reservoir with the formation of a typical vortex while the pump element is still operating with flow indicating arrows indicating circulation of fluid to the pressure sensing element and in the by-pass line discharging at the "eye of the impeller."

Figure 3 is a schematic elevational view showing the system and apparatus of the present invention at shut off, the pressure sensing element having de-energized the pumping element and with directional arrows indicating pressure diminution and flow of the fluid pressure media.

Figure 4 is a schematic elevational view showing the invention and apparatus after shut-off and the reservoir now awaits refilling to the preselected operational level as shown in Figure 1 to complete the cycle.

Figure 5 is a cut-away elevational view of a specific embodiment of the present invention as applied to laundry tray use showing in a specific application, the positioning of the pressure sensing element, the pump, and fluid conduits.

Figure 6 is a partial plan view of the embodiment shown in Figure 5 and illustrating the desired positioning of the discharge pressure line in the discharge body of the pump.

Figure 7 is a partial elevational view of a simple valve in the discharge pressure line which provides a variable orifice making possible the adjustment of sensitivity to a variety of pumping conditions and a variety of locations of the pressure sensing unit lead from the discharge of the pump.

General description

In general a single pressure sensitive element is positioned beneath a reservoir to operate on the differential of pressure between atmospheric and the pressure exerted by the static head in the reservoir and the discharge pressure exerted on the fluid contents by a pumping unit during evacuation. Conduits or fluid leads connect the pressure sensing unit to both the discharge and the outlet of the reservoir, which might be and preferably is at the inlet of the pumping means. With this arrangement and a suitable electrical circuit acted upon by the pressure sensing means, control over the energization of the pumping means is established as follows: As a reservoir fills an increasing static head of pressure is established until at a prearranged pressure over atmospheric the pressure sensing means closes an electrical circuit to activate the pumping means. Without more the pump means would merely operate to reduce the static head within the sensitiveness of the pressure sensing means and the electrical circuit would then be opened and the pumping means would cease operation. However, when pumping commences a second pressure of normally greater magnitude than the static head pressure is applied to the pressure sensing means holding the electrical circuit closed so that the pump means continues its operation. This second pressure is derived from the discharge of the pumping means and flows through a control conduit to the pressure sensing means, the surplusage of volume being recycled through the conduit which originally partially delivered the static head pressure response to the pressure sensing means. When the contents of the reservoir are exhausted to a level above the mean level of the reservoir by the pumping means, the pressure of the discharge is greatly reduced and the electrical circuit to the pumping means is broken. The by-pass conduit registering the static head pressure provides a convenient surge reduction and the pump means is smoothly de-energized without intermittent on-off false movements as might normally be anticipated. The pump means is not again energized until the contents of the reservoir reach the predetermined static level. The pumping means is thus automatically controlled without floats or intricate time-delay mechanism and the contents of the reservoir are substantially removed.

A valve located in the pressure control conduit provides a wide adjustment of the system to specific pumping characteristics and allows wide range in the selection of position of the control conduit in the discharge arm of the pump.

The circulating effect within the pressure conduit from the discharge and the static head conduit assures a rapid release of pressure from the pressure sensing means and eliminates entrapment of sediment and the like. As applied to laundry trays and other vessels where the contents require elevation to a drain above the laundry tray level the system has proved exceptionally useful. Similarly, the units employing the instant system have great utility in chemical unit processes where the pumping unit there serves as an automatic metering element.

*Specific description*

Referring more particularly to the drawings Figures 1, 2, 3, and 4 schematically show a reservoir 11, a pump unit 12 with attached impeller 13, and a discharge pipe 14 leading from the pump 12. The reservoir outlet 15 communicates the contents 16 of the reservoir 11 with the pump 12 through the pump inlet 17 located on the suction side of the pump 12. A motor 18 is driveably connected, as by shaft 19, with the impeller 13 and is suitably sealed. A pressure sensing element 20 comprising a diaphragm 21 having one side 22 exposed to the atmosphere and the other side 23 connected to conduits 24 and 25 is positioned adjacent the pump 12. The conduit 24 communicates with the contents 16 of the reservoir 11 to transmit to the pressure sensing element 20 a pressure response reflecting the pressure head of the contents 16 in the reservoir 11. The conduit 25 communicates with the discharge side of the pump 12 and relays the pressure developed during discharge to the pressure sensing element 20. Under static conditions both conduits 24 and 25 serve to transmit static head pressure in the reservoir 11 to the diaphragm 21. A piston 26 is positioned in contact with diaphragm 21 and moves with the diaphragm 21. A normally open switch 27 is closed by the action of the pressure sensing element 20, the switch 27 being adjustable so as to close a circuit 28 at any selected pressure corresponding to a particular level of contents 16 in the reservoir 11. The circuit 28 energizes the pumping means 12 and its motor 18 when the switch 27 is closed. When pressure upon the diaphragm 21 from the conduit 25 approaches atmospheric pressure, the diaphragm 21 collapses, the piston 26 moves with it and the switch 27 opens the circuit 28 stopping the pump motor 18. This pressure drop occurs when the contents 16 of the reservoir 11 are exhausted therefrom. The discharge pipe 29 leads to a delivery point such as a drain (not shown) located above the mean level of contents 16 within the reservoir 11. The Figures 1, 2, 3, and 4 thus show the sequential operation of the system of the invention through an entire cycle of operation. Figure 1 indicates the system at the instant where the static pressure of the material in the reservoir 11 causes energization of the pumping means 12. Figure 2 indicates the maintaining of operation by discharge pressure on the pressure sensing means and demonstrates the circulation through the by-pass conduit 24 returning a part of the volume to the suction side 17 of the pump 12. Figure 3 illustrates the system at the instant of pressure drop usually as cavitation or bubbles break through into the discharge. Figure 4 shows the system at cessation of operation at the close of an automatic operational cycle.

Referring to Figures 5 and 6, a specific embodiment of the inventive system is shown and the corresponding basic parts illustrated in Figures 1, 2, 3, and 4 are correspondingly numbered. For perfect operation the conduit 24 commences at the so-called "eye of the impeller" 30. With reference to Figures 3 and 4, this is desirable since it avoids interferences with the vortex established on the axis of the reservoir outlet 15 during evacuation. Thus, the particular location of the conduit 24 is desirable to avoid surge or disturbance which might otherwise interfere with the pressure relationship established in the pressure sensing element 20 during operation of the pump 12. Similarly, and assuming the use of a centrifugal type pump 12, as shown, the discharge lead or conduit 25 leading to the pressure sensing element 20 is preferably located at the pump casing 31 rather than simply in the discharge pipe 14. Experimenting with various positions it was found that best results were obtained when a position through the casing 31 was selected prior to ultimate discharge from the pump casing 31 so as to reflect something less in pressure than the total discharge pressure. Such a selection of position must obviously have in mind the characteristics of a given pump. In the ordinary centrifugal pump the location in the casing 31 as relatively shown in the plan view of Figure 6 was found most desirable.

For smooth operation selected orifices were found desirable for the suppression of "surge effect" on the pressure sensing element 20. An orifice A was provided in the discharge conduit 25 at the entry on the discharge side of the pump 12. An orifice B of lesser diameter was provided in the discharge conduit 25 where it joins the conduit 24. A third orifice C at the "eye of the impeller" 30 is provided which is greater in diameter than either orifice A or B. Through a wide variety of pumping situations the indicated size relationships have held consistently desirable. In a specific operative unit the respective orificial sizes were as follows:

| | Inches internal diameter |
|---|---|
| Orifice A | .189 |
| Orifice B | .154 |
| Orifice C | .281 |

A variable orifice provided by the valve D (a simple shut off cock) and located in the pressure conduit 25 was found to compensate for variant pump characteristics so that a wide range of locations of the pressure conduit 25 on the discharge side of the pump 12 was possible. The valve D (Figure 7) permits rapid field adjustment of the pumping system so as to adjust to selected operating settings and pump characteristics.

The pressure sensing element 20 comprises a diaphragm 21, preferably resistant to mechanical fatigue and made from Buna N material sandwiching a nylon fabric. The diaphragm 21 is peripherally sealed between two generally hemispheric shells 32a and 32b having mating peripheral flanges at their juncture. Fastener elements 33 secure the diaphragm 21 between the flanges of the shells 32a and 32b. The inner portion of the uppermost shell 32a is exposed to atmospheric pressure. The lower shell 32b is connected to conduits 24 and 25 and contains the pressures transmitted by the conduits 24 and 25 to the diaphragm 21. A winged collapse suppressor 34 is positioned between the diaphragm 21 and the lower portion of the shell 32b to prevent sticking of the diaphragm 21 to the shell 32b and possible sealing of the communicating passages. The shell 32a axially houses the piston 26 with its presser disc 34a. A bearing 35 is also axially provided through the upper portion of the shell 32a permitting axial movement of the piston 26. The upper shell 32a is riveted or otherwise fastened to switch housing 36. The piston 26 is preferably of nylon to dampen vibrational disturbance and to provide an insulated contact with the actuating leaf 37 of the normally open switch 27. As the pressure in shell 32b exceeds the atmospheric pressure in shell 32a, the diaphragm 21 flexes upwardly moving the presser disc 34a and connected piston 26 against the spring bias of the switch 27. When sufficient pressure is exerted the switch contacts 38 and 39 close, closing the electrical circuit 28 and starting the pump motor 18. The particular switch 27 found most satisfactory in such applications is the switch described in pending application for United States Letters Patent for Electrical Switch by Michael Collette, Serial Number 571,993 filed on March 16, 1956. The illustrated reservoir 11 is in fact a laundry tray unit and the contents of the tray are pumped to a sewer connection located at a level above the mean level of the tray contents.

Flow tests employing transparent plastic conduits, trays, pump bodies, pressure sensing element enclosures and the like were conducted under a variety of conditions employing dye to trace flow patterns as shown in the schematic diagrams. Operation without the by-pass conduit 24 was unsuccessful. Various size relationships as between orifices were experimented with and optimum conditions obtained, when the size relationship between orifices as dimensionally represented were employed. Sediment plugging appeared to have been eliminated completely with ⅛ inch nominal size pipe nipples were employed as conduits 24 and 25. A standard T for ⅛ inch nominal size pipe provided the connection between conduits 24 and 25, and the pressure sensing element 20.

While a variety of specific materials and a wide variety of pumping elements and switches of various capacities may be employed it is intended that the scope of the instant invention be limited only to the extent of the hereinafter appended claims.

We claim:

1. In an automatic reservoir emptying system, the combination comprising: a reservoir; a pump having an inlet and an outlet beneath the lowest level of said reservoir, the inlet of said pump receiving contents from said reservoir; a pressure actuated diaphragm; plunger means in contact with said diaphragm on the atmospheric pressure side; a conduit receiving contents discharged from the outlet side of said pump and communicating a part of said contents to the pressure side of said diaphragm; a by-pass conduit connected to the inlet side of said pump and said diaphragm on the pressure side; a switch acted upon by said plunger; a motor drivably connected to said pump; and an electrical circuit selectively energizing said motor in response to the opening and closing of said switch.

2. In an automatic reservoir emptying system responsive to the static head of contents within the reservoir and for delivering reservoir contents above the level of contents in said reservoir, the combination comprising: pumping means having an inlet and a discharge outlet; a pressure sensitive member, selectively actuating and deactuating said pumping means; a switch acted upon by said pressure sensitive member; a first passage to said pressure sensitive member from the inlet of said pumping means; a second passage from the discharge side of said pumping means to said pressure sensing member and connecting with said first passage.

3. In an automatic reservoir emptying system as in claim 2, the combination including a valve element selectively adjusting the flow in said first passage and said second passage and located in said second passage substantially between said pressure sensitive member and the discharge outlet of said pumping means.

4. In a lift system for raising the contents of a reservoir above the mean static head and completely emptying the contents of said reservoir automatically, the combination comprising: a reservoir, pumping means located beneath the lowest level of said reservoir and having an inlet for receiving the contents of said reservoir and an outlet discharging said contents under positive pressure sufficient to lift the contents of said reservoir at least above a mean static head established by the contents of said reservoir; a means sensing the static head of the contents of said reservoir and energizing said pumping means when the static head of the contents reach a predetermined magnitude, said sensing means also continuing to energize said pumping means until the pressure of the discharge from said pumping means is materially reduced below the original static head of the contents, said sensing means connected to said outlet of said pump and said inlet of said pump in a common connection.

5. In a pumping system, the combination comprising: a source of accumulative hydrostatic pressure; a pump having an inlet connected to said source of hydrostatic pressure substantially at the bottom thereof; a pressure conduit in the outlet of said pump; diaphragm means connected to said pressure conduit on the pressure side thereof; and a by-pass conduit connecting the pressure conduit to the inlet of said pump; and switch means acted upon by said diaphragm on the atomspheric side thereof selectively energizing and deenergizing said pump.

6. In a pumping system for substantially instantaneous cutoff, the combination comprising: a motor driven pump having an inlet and a discharge; diaphragm means; a T-conduit connecting a part of said discharge to said diaphragm means and to the inlet of said pump; and switch means on the atmospheric side of said diaphragm selectively starting and sustaining the operation of said pump and stopping said pump in accord with pressure conditions existing in said T-conduit.

7. In an automatic reservoir emptying system with automatic shutoff, the combination comprising: a reservoir; a pump and having an outlet and an inlet beneath said reservoir said inlet being connected to said reservoir to receive the contents therefrom; a pressure actuated diaphragm, one side thereof exposed to atmospheric pressure; plunger means in contact with said diaphragm on the atmospheric side thereof; a first conduit receiving a part of the contents discharged from the outlet side of said pump and communicating said part of said contents to the pressure side of said diaphragm; a by-pass conduit connected to said first conduit substantially at said diaphragm at one end and connected to the inlet of said pump at its other end; a switch acted upon by said plunger; a motor driveably connected to said pump and an electrical circuit selectively energizing said motor in response to the opening and closing of said switch.

8. In an automatic reservoir emptying system substantially as set forth in claim 8, the combination including an orifice defined by said first conduit at said pump outlet; a second orifice defined by said first conduit substantially adjacent the pressure side of said diaphragm; and a third orifice defined by said by-pass conduit substantially at the inlet of said pump wherein the said third orifice is greater in size than said first and said second orifice, and said first orifice is greater in size than said second orifice.

References Cited in the file of this patent

UNITED STATES PATENTS

| | | |
|---|---|---|
| 2,488,506 | Bernhardt | Nov. 15, 1949 |
| 2,635,546 | Enyeart et al. | Apr. 22, 1953 |
| 2,804,516 | Staak | Aug. 27, 1957 |
| 2,834,845 | Nielsen | May 13, 1958 |

UNITED STATES PATENT OFFICE

CERTIFICATE OF CORRECTION

Patent No. 2,945,446                                            July 19, 1960

William G. Mason et al.

It is hereby certified that error appears in the printed specification of the above numbered patent requiring correction and that the said Letters Patent should read as corrected below.

Column 1, line 56, for "A" read -- AS --; column 7, line 8, for the claim reference numeral "8" read -- 7 --.

Signed and sealed this 31st day of January 1961.

(SEAL)
Attest:

KARL H. AXLINE
Attesting Officer

ROBERT C. WATSON
Commissioner of Patents